United States Patent
Mimura

[11] Patent Number: 5,904,073
[45] Date of Patent: May 18, 1999

[54] BALLS AND CAM TYPE DIFFERENTIAL GEAR

[76] Inventor: Kenji Mimura, 29-1105, Wakabadai 4-chome, Asahi-ku, Yokohama-shi, Kanagawa, 241, Japan

[21] Appl. No.: 08/868,054

[22] Filed: Jun. 3, 1997

[30] Foreign Application Priority Data

Jun. 3, 1996 [JP] Japan .................................. 8-140454

[51] Int. Cl.$^6$ .................................................. B60K 17/16
[52] U.S. Cl. .............................................. 74/650; 476/36
[58] Field of Search .......................... 476/18, 36; 74/650

[56] References Cited

U.S. PATENT DOCUMENTS

| | | | |
|---|---|---|---|
| 5,016,487 | 5/1991 | Bollman | 476/36 |
| 5,577,423 | 11/1996 | Mimura | 74/650 |

FOREIGN PATENT DOCUMENTS

| | | | |
|---|---|---|---|
| 1208442 | 2/1960 | France | 74/650 |
| 391583 | 10/1924 | Germany | 74/650 |
| 801421 | 1/1951 | Germany | 74/650 |
| 2-85552 | 3/1990 | Japan | 74/650 |
| 1507603 | 9/1989 | Russian Federation | 74/650 |

*Primary Examiner*—Khoi Q. Ta
*Attorney, Agent, or Firm*—Lowe Hauptman Gopstein Gilman & Berner

[57] ABSTRACT

The present invention provides a differential gear which is capable of constructing an axle supporting structure at a low cost and obtaining a differential limiting effect without adding a special mechanism. In the present invention, each axle is coupled to the main body of the differential gear by regulating movement of each axle in the insertion direction and the counter-insertion direction by both a regulating member engaging with each axle and a regulating member interposed between the end surfaces of the axles. In this case, differential motion is achieved by both grooves provided in a pair of rotating bodies which rotates integrally with drive shafts and a plurality of balls 5 which roll along the grooves, and the differential motion is limited by the reactive force generated between each groove and the rolling bodies. Thus, a differential limiting effect is obtainable without adding a special mechanism.

2 Claims, 7 Drawing Sheets

BALLS AND CAM TYPE DIFFERENTIAL GEAR

BACKGROUND OF THE INVENTION

1. Field of the Invention

The present invention relates to a differential gear that allows the difference of rotation between the left and right driving wheels of an automobile.

2. Description of the Prior Art

A differential gear is generally known as an apparatus that allows the difference of rotation between the left and right driving wheels of a vehicle when it travels curves in a road. The differential gear includes a pinion gear interposed between a pair of bevel gears coupled to the left and right axles of the driving wheels. If the shaft of the pinion gear is given an external rotational force, the pinion gear rotates on its axis during differential operation so that the difference of rotation between the axles is allowed. Such a differential gear has been utilized mainly in small tracks. In the differential gear for small tracks, the left and right axles of a vehicle are first inserted into the coupling holes provided in the bevel gears. Then, regulating members for antislip-out are mounted on the end portions of the left and right axles to regulate the movement of the axles in a direction (hereinafter referred to as a counter-insertion direction) opposite to the direction in which each axle is inserted. Furthermore, the end surfaces of the left and right axles abut the shaft of the pinion gear interposed between the bevel gears, thereby regulating the movement of each axle in the insertion direction in which the axle is inserted. A structure such as this renders it unnecessary to provide a complicated bearing for regulating the axial movement of each axle and has the advantage that the support structure for each axle can be constructed simply and inexpensively. For this reason, this structure has been utilized mainly in vehicles where low fabrication cost is desired, such as small trucks.

During travel on a road, if only one of the driving wheels runs on a road surface whose friction coefficient is extremely small, such as a snowy road surface and a sandy road surface, the one driving wheel will skid due to differential motion and the entire driving force will be lost, and in some cases, the vehicle cannot escape from that place. Also, while traveling curves in a road at high speeds, when the weight of the inner wheel is extremely reduced due to the centrifugal force, there arises the problem that the wheel skids on the road and therefore a driving force for traveling curves in the road at high speeds is lost. Hence, some vehicles are provided with a mechanism which limits the differential motion between the driving wheels in such a circumstance. It is general to employ a pressure clutch disc or a viscous coupling as a differential limiting mechanism. However, the differential limiting mechanism employing a clutch disc or a viscous coupling is a device which is added separately to the differential gear, so the structure becomes complicated and expensive, and even if the axle supporting structure were constructed at a low cost, there would arise the problem that the cost would be increased as a result of the complicated structure of the differential limiting mechanism.

SUMMARY OF THE INVENTION

The present invention has been made in view of the aforementioned problems. Accordingly, it is the objective of the present invention to provide a differential gear which is capable of constructing an axle supporting structure at a low cost and obtaining a differential limiting effect without adding a special mechanism.

To achieve the above objective, a differential gear of the present invention comprises a pair of rotating bodies arranged coaxially so that they are opposed with each other in an axial direction. The rotating bodies have holes into which left and right axles of a vehicle are inserted. The differential gear further comprises a case body which rotates on an axis coaxial with the rotating bodies, a plurality of rolling bodies arranged with spaces in a circumferential direction between radially opposed surfaces of each rotating body and the case body, and a plurality of hold bodies arranged with the spaces in the circumferential direction between the radially opposed surfaces so that the hold bodies are freely movable in an axial direction. Each hold body holds the rolling bodies, which correspond to each other in an axial direction of each rotating body, so that the rolling bodies can freely roll. The differential gear further comprises first regulating members and a second regulating member. The first regulating members engage end portions of the axles inserted in the holes of the rotating bodies and abut end surfaces of the rotating bodies so that movement of the axles in the counter-insertion direction is regulated. The second regulating member is interposed between the end surfaces of the axles inserted in the holes of the rotating bodies. The second regulating member abuts the end surfaces so that movement of the axles in the insertion direction is regulated. The case body is formed with a plurality of grooves each extending in the axial direction of each rotating body, and each groove is engaged by the rolling bodies so that the rolling bodies are freely movable. The surface of each rotating body, radially opposed to the case body, is formed with a groove which extends continuously in a circumferential direction of the rotating body and which is engaged by the rolling bodies. The groove of each rotating body is formed so that if a difference of rotation occurs between the rotating bodies, the hold bodies and each rolling body can reciprocate in the axial direction of each rotating body along the groove of the case body.

According to the aforementioned differential gear, the movement of each axle in the insertion direction and the counter-insertion direction is regulated by each regulating member, and each axle is coupled to the main body of the differential gear. Also, if the case body and the hold bodies are rotated on the rotational axes, this rotational force will be transmitted to the groove of each rotating body through each rolling body and each rotating body will rotate integrally with the case body. Now, if a difference of rotation occurs between the axles coupled to the rotating bodies, the rolling bodies will be guided along the grooves of the rotating bodies and roll. The rolling bodies reciprocate in the axial direction of the rotating body along the grooves of the case body. At this time, if a force for generating a difference of rotation between the rotating bodies is applied to one rotating body, in the other rotating body the rolling body which becomes a driven side during differential motion will cause the groove, which becomes a drive side during differential motion, to follow the movement of the rolling body. Therefore, the reactive force, generated at this time, becomes a resisting force so that the differential motion between the rotating bodies is limited. Therefore, the support structure for axles can be constructed simply and inexpensively. In addition, a differential limiting effect is obtainable without adding a special mechanism, so a considerable reduction in the cost can be achieved and this structure is extremely advantageous to vehicles where low fabrication cost is desired.

In addition, in the aforementioned differential gear, the case body is provided with a hole at its side surface, and the first and second regulating members are inserted into the case body through the hole. After the axles are inserted into the main body of the differential gear, the first and second regulating members are inserted into the case body through the hole of the case body. With this, each axle is coupled to the case body without disassembling the main body of the differential gear. Consequently, the differential gear is extremely advantageous to vehicle fabrication.

BRIEF DESCRIPTION OF THE DRAWINGS

The present invention will be described in further detail with reference to the accompanying drawings in which.

DETAILED DESCRIPTION OF THE PREFERRED EMBODIMENTS

A differential gear of the present invention comprises a gear case 1, a gear case cover 2 for closing one end of the gear case 1, a pair of ball discs 3 arranged coaxially with each other, a great number of ball holders 4 arranged between the gear case 1 and each ball disc 3, a great number of balls 5 held in ball holders 4 so as to be able to freely roll, a spacer ring 6 arranged between the ball discs 3, and thrust washers 7 arranged on the rear side of each ball disc 3. The ball discs 3 are coupled to left and right drive shafts 8 (which serve as axles), respectively. The differential gear of this embodiment is further provided with a stopper shaft 9 interposed between the end surfaces of the drive shafts 8 and a pair of stopper rings 10 which engage with the end portions of the drive shafts 8.

Figure 1:
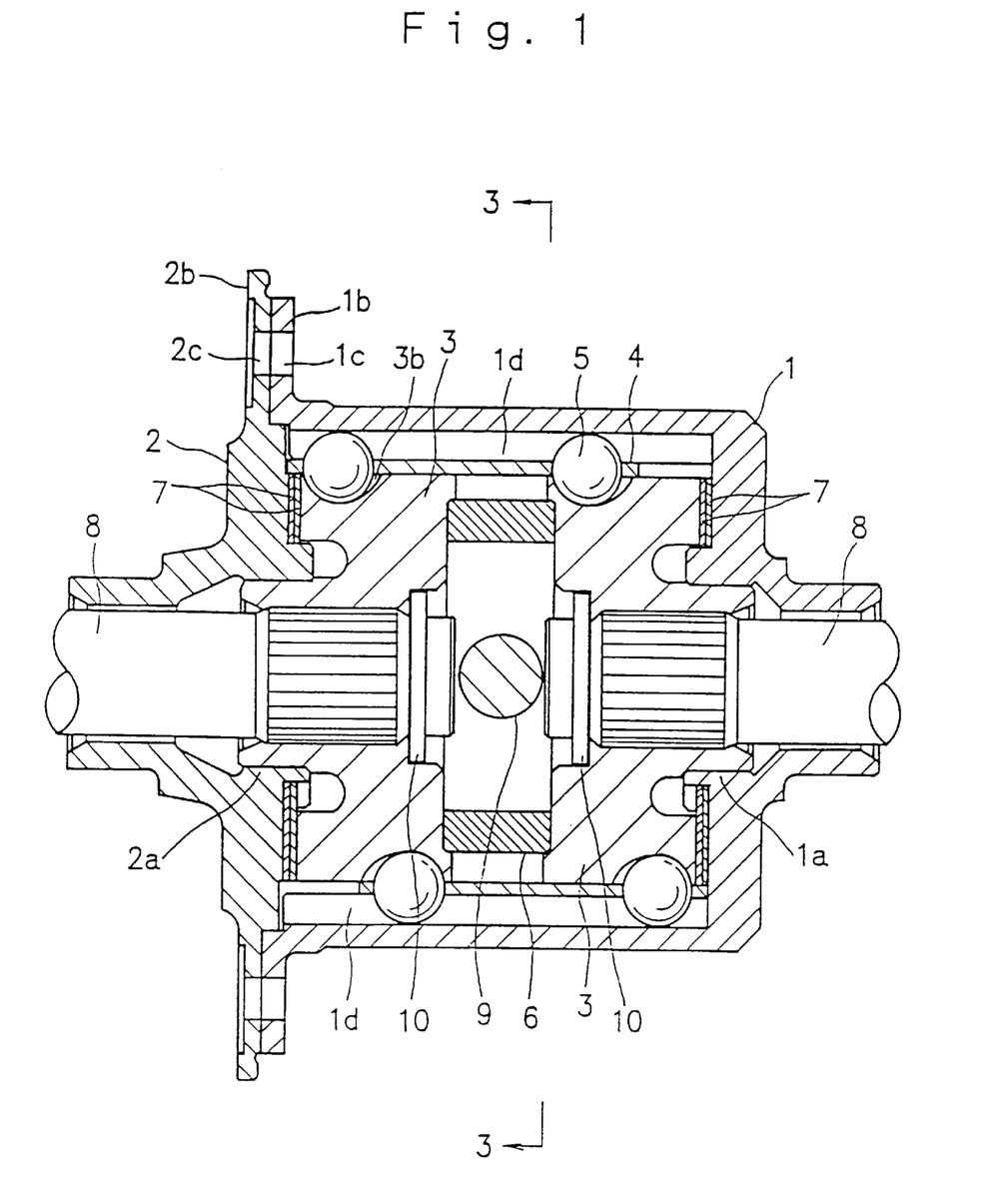
FIG. 1 is a side sectional view of a differential gear according to an embodiment of the present invention.
Figure 2:
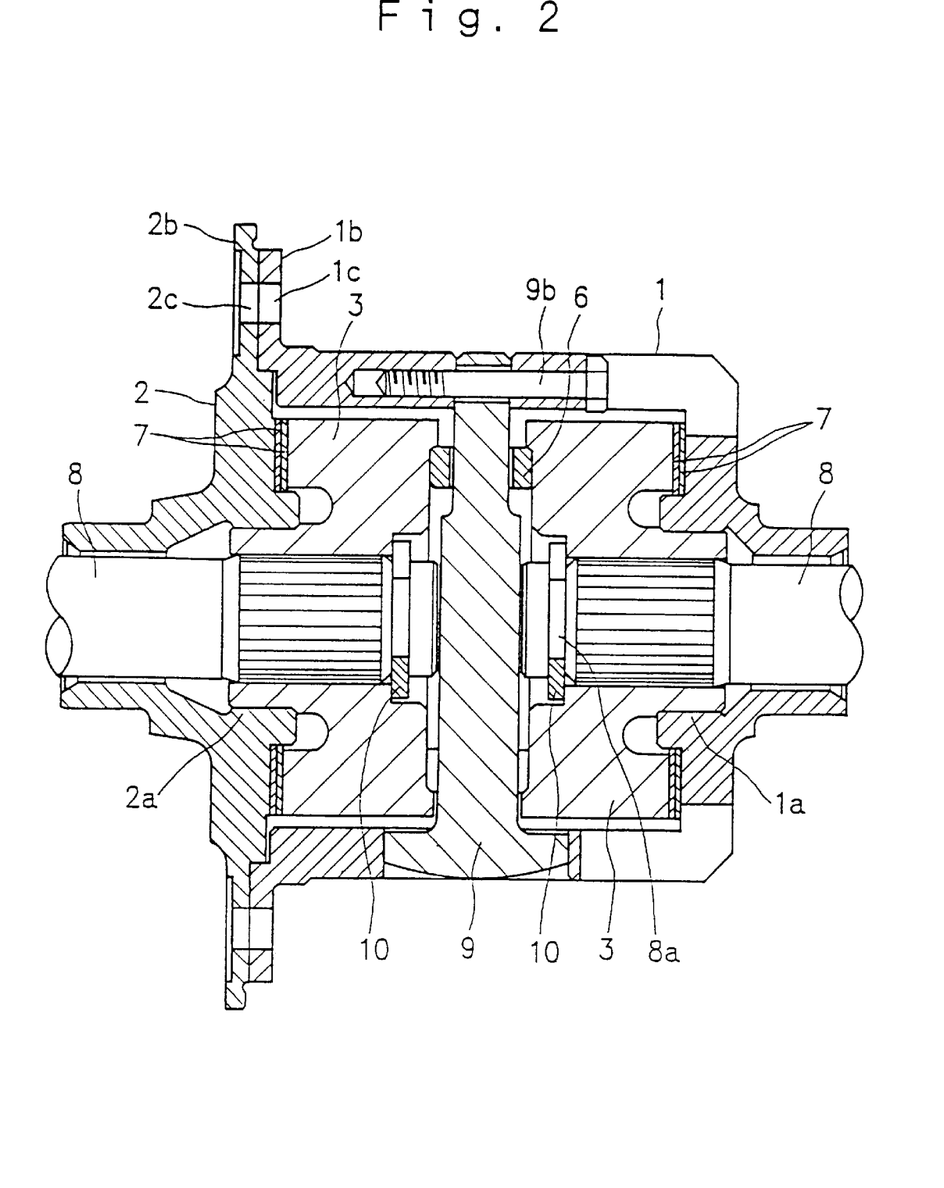
FIG. 2 is a plan sectional view of the differential gear shown in FIG. 1.
Figure 3:
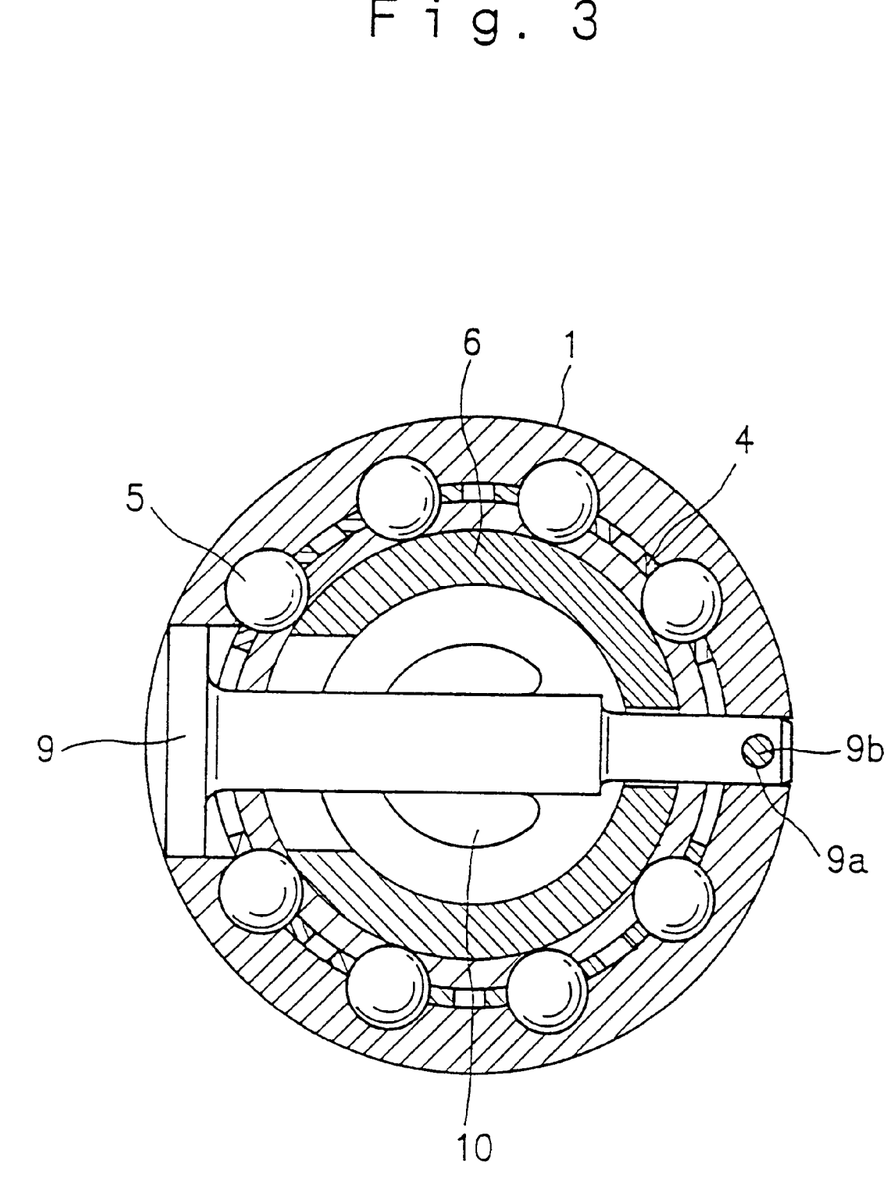
FIG. 3 is a sectional view of the differential gear in FIG. 1 taken substantially along line A—A of FIG. 1.
Figure 4:
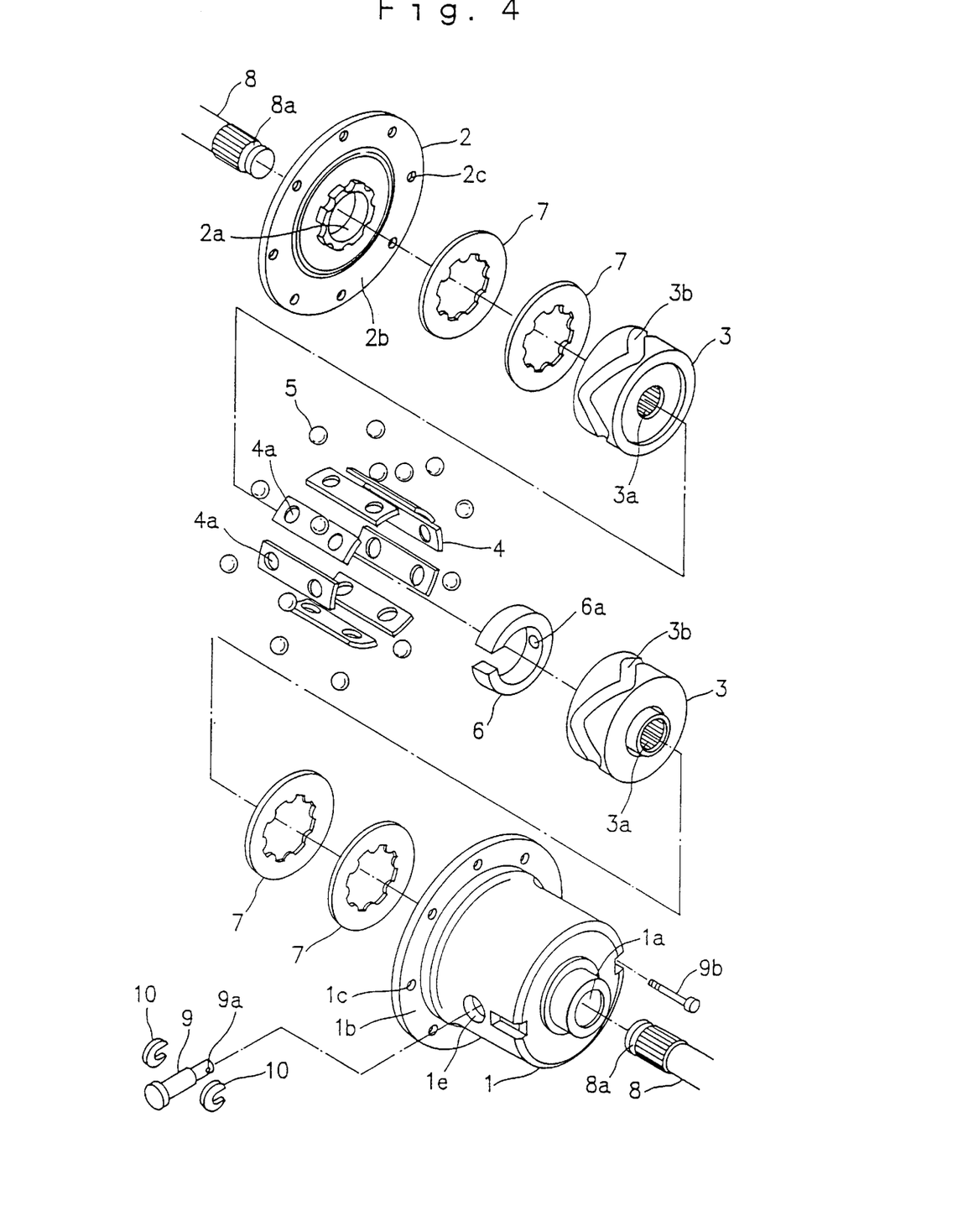
FIG. 4 is an exploded perspective view of the differential gear.

The gear case 1 is formed into a cylinder shape having an opening at its one end, and the center portion is provided with a bearing 1a which supports one of the ball discs 3. The circumference of the gear case 1 is provided with a flange 1b, in which a great number of holes 1c for bolt insertion are provided. A great number of grooves 1d are provided in the inner peripheral surface of the gear case 1. The grooves 1d extend linearly in the axial direction of the gear case 1 and are provided at equal intervals in the circumferential direction of the gear case 1. Furthermore, a hole 1e for inserting the stopper shaft 9 and the stopper rings 10 is provided in the side surface of the gear case 1.

The gear case cover 2 is formed into a circular disc shape, and the center portion is provided with a bearing 2a which supports the other ball disc 3. The circumference of the gear case cover 2 is provided with a flange 2b, in which a great number of holes 2c for bolt insertion are provided. The gear case cover 2 is attached to the gear case 1 by means of bolts (not shown) which connect the flanges 1b and 2b together.

Figure 5:
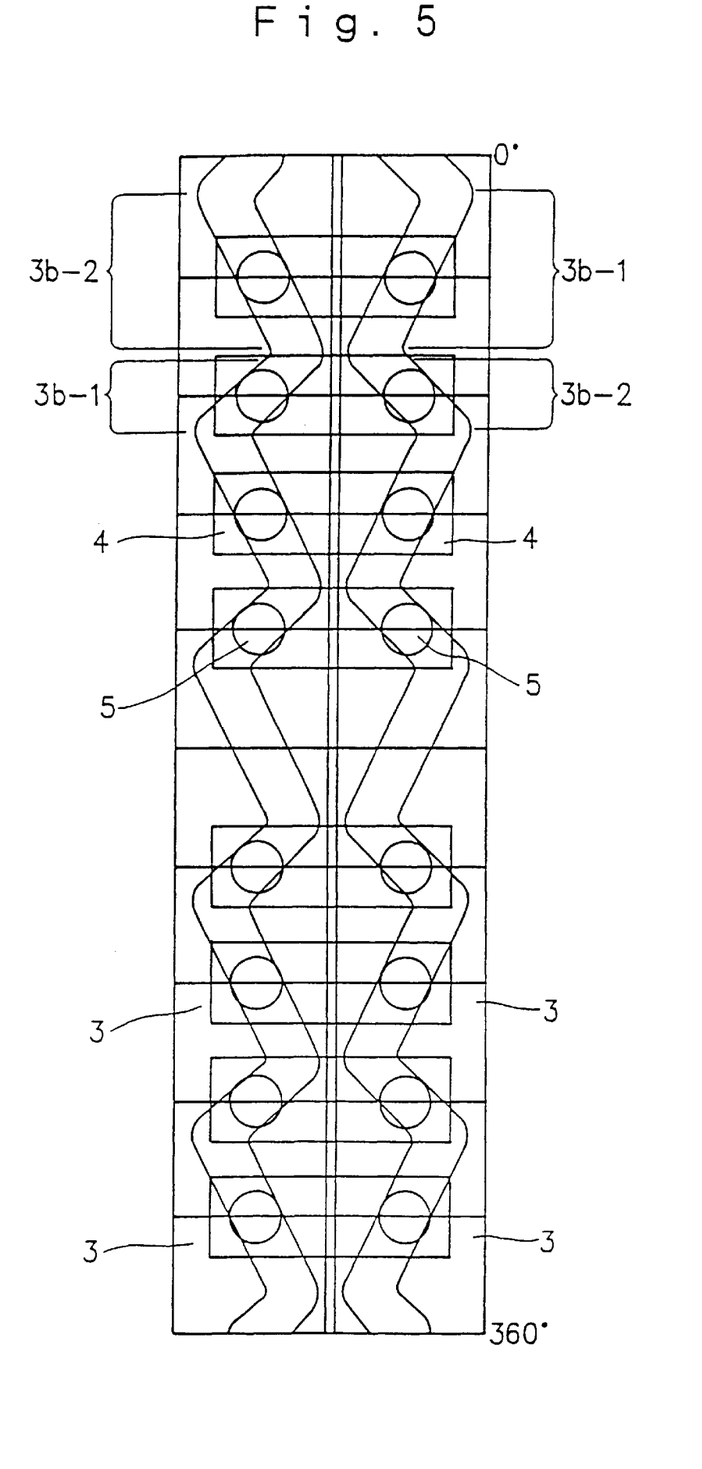
FIG. 5 is a development diagram of the grooves formed in the ball discs of FIG. 1.

The ball discs 3 have diameters equal to each other and are opposed at the end surfaces. Each ball disc 3 has a coupling hole 3a for coupling each drive shaft 8, and each coupling hole 3a is provided so as to penetrate the ball disc 3 in the axial direction. The inner peripheral surface of each coupling hole 3a and the outer peripheral surface of each drive shaft 8 are formed with splines which engage each other. Each drive shaft 8 is coupled through the splines to the ball disc 3 in the rotational direction so that the drive shaft is allowed to move in the axial direction of the ball disc 3. The outer peripheral surface of each ball disc 3 is provided with a groove 3b which each ball 5 engages so as to be able to freely roll. The groove 3b is formed continuously in the circumferential direction of the ball disc 3. FIG. 5 illustrates the ball discs 3 developed into a flat shape, and angles 0 through 360° in the figure indicate positions in the circumferential direction. Each groove 3b alternately continuously has a first guide section 3b-1 where the ball 5 is moved from an axially outer position on the ball disc 3 to an axially inner position on the ball disc 3 and a second guide section 3b-2 where the ball 5 is moved from the axially inner position to the axially outer position. In one of the ball discs 3, the first guide section 3b-1 is formed so as to be longer in the circumferential direction than the second guide section 3b-2. In the other ball disc 3, the second guide section 3b-2 is formed so as to be longer in the circumferential direction than the first guide section 3b-1. That is, in the ball discs 3, when the axial inverting positions of one groove 3b are equal in the circumferential direction, the inverting positions of the other groove 3b are shifted from each other in the circumferential direction.

Each ball holder 4 is formed into a plate shape extending from the peripheral surface of one ball disc 3 to the peripheral surface of the other ball disc 3. Between the gear case 1 and each ball disc 3, the ball holders 4 are spaced in the circumferential direction and provided so as to be freely movable in the axial direction. Each ball holder 4 has two holes 4a in which the axially corresponding balls 5 of the ball discs 3 are housed, and the ball holder 4 reciprocates in the axial direction of the ball disc 3 with the balls 5 held at a predetermined space.

Each ball 5 is housed in the hole 4a of each ball holder 4 and engages both the groove 1d of the gear case 1 and the groove 3b of each ball disc 3.

The spacer ring 6 is formed into a C-letter shape where part of the circumferential portion is cut out, and the portion of the spacer ring 6 on the opposite side of this cutout is provided with a hole 6a through which one end of the stopper shaft 9 is inserted.

Two thrust washers 7 are provided on the rear side of each ball holder 4, and the washers 7 are attached to the gear case 1 and the gear case cover 2, respectively.

Each drive shaft 8 has an annular groove 8a at its front end portion, and the groove 8a is engaged by the stopper ring 10.

The stopper shaft 9 is inserted through the cutout of the spacer ring 6 so that the front end is inserted in the hole 6a of the spacer ring 6, and the shaft 9 is fixed to the gear case 1 by means of a bolt 9b inserted in the hole 9a provided in the front end of the shaft 9.

Each stopper ring 10 is formed into a C-letter shape where part of the circumferential portion is cut out, and the ring 10 engages the groove 8a of the drive shaft 8 through this cutout.

In the differential gear constructed as described above, a ring gear (not shown) for transmitting a driving force from the engine is attached to the flange 1b of the gear case 1 so that the entire apparatus rotates on its rotational axis. That is, if a driving force is input to the gear case 1, each ball holder 4 will be rotated integrally with the gear case 1. This rotational force is transmitted to the groove 3b of each ball disc 3 through each ball 5 and is transmitted to each drive shaft 8 coupled to each ball disc 3.

Now, if a difference of rotation occurs between the ball discs 3, each ball 5 will be guided along the groove 3b of each ball disc 3 and roll. The ball 5 reciprocates in the axial direction of the ball disc 3 along with the corresponding ball holder 4. More specifically, in FIG. 5 the ball 5, which has been on the axially outer side of the ball disc 3, is moved axially inward along the first guide section 3b-1 of each groove 3b. After reaching the inner inverting position of the groove 3b, the ball 5 is moved axially outward along the second guide section 3b-2 of each groove 3b. In this case, half of the balls 5 alternately reach the outer inverting positions of the grooves 3b. However, when the inverting positions of each groove 3b are equal either on the inner side or on the outer side, the inverting positions are shifted from each other on the other side. Therefore, other balls 5 have not reached the inverting positions. That is, when the ball 5 reaches the inverting position of each groove 12b, no force is transmitted between the ball 5 and the groove 3b. For this reason, the balls and the grooves are constructed so that all balls 5 do not reach the inverting positions of each groove 3b at the same time. Also, if the driving force, input to the gear case 1, is transmitted to each ball disc 3, the reactive force on the contact surface between the groove 3b and each ball 5 will act on the groove 3b of each ball disk 3, and each ball disk 3 will try to move in the direction of the rotational shaft and generate thrust force. At this time, if a force for generating a difference of rotation between the ball discs 3 is applied to one ball disk 3, in the other ball disc 3 the ball 5 which becomes a driven side during differential motion will cause the groove 3b, which becomes a drive side during differential motion, to follow the movement of the ball 5. Therefore, the reactive force, generated at this time, becomes a resisting force so that the differential motion between the ball discs 3 is limited.

Figure 6:
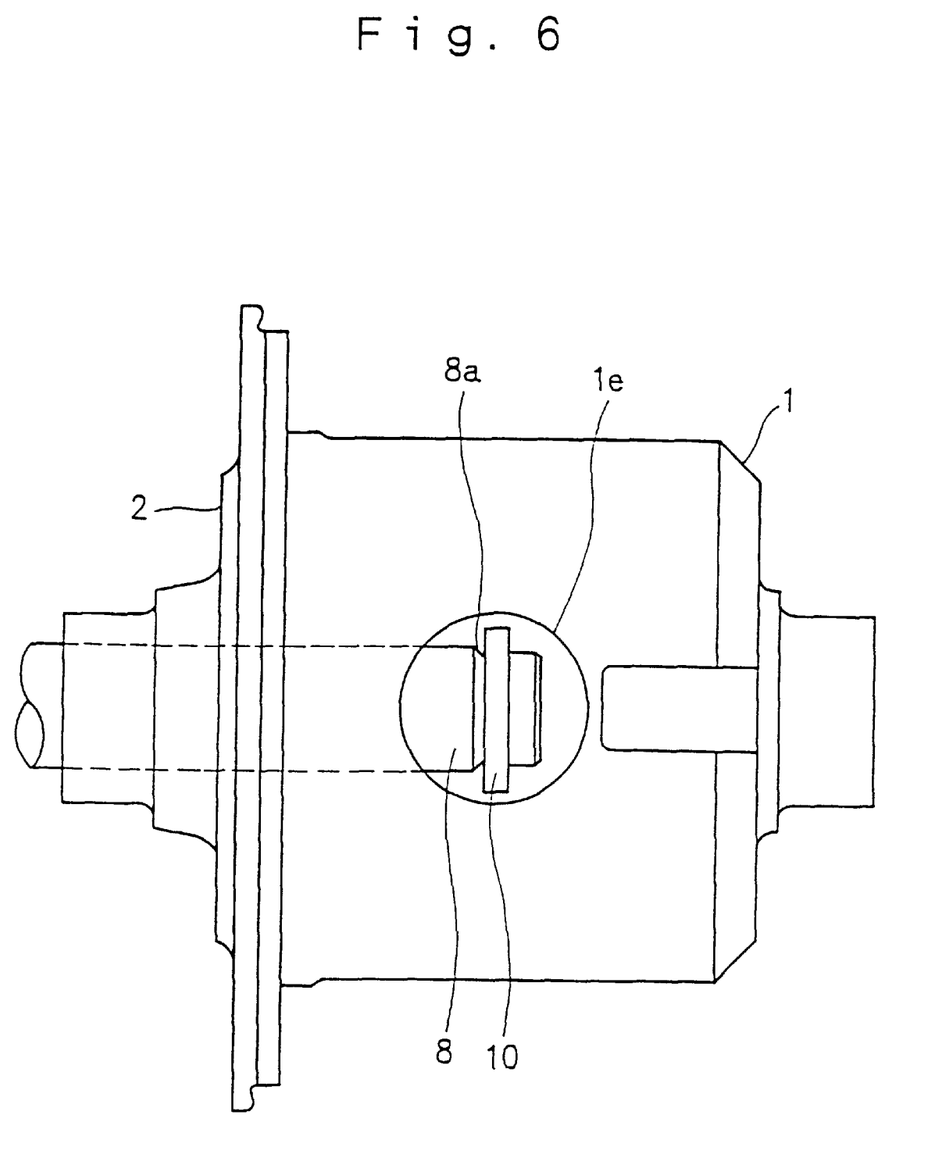
FIG. 6 is a side view used to explain how drive shafts are connected to the main body of the differential gear.
Figure 7:
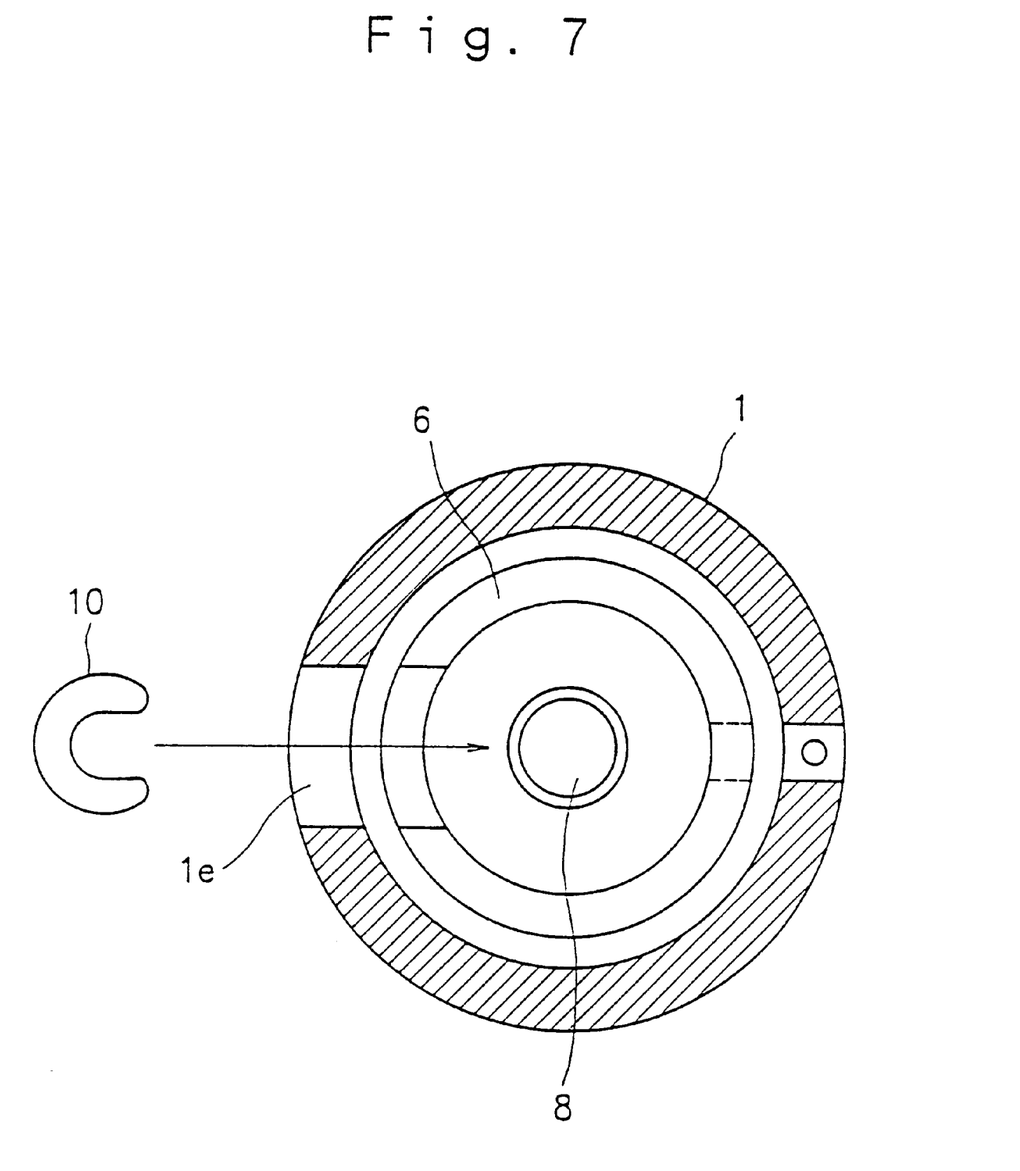
FIG. 7 is a sectional view used to explain how drive shafts are connected to the main body of the differential gear.

In the aforementioned differential gear, in the case where the drive shafts 8 are connected to the ball discs 3, one of the drive shafts 8 is first inserted into one end of the main body of the differential gear so that the front end of the drive shaft 8 is positioned under the hole 1e of the gear case 1, as shown in FIG. 6. Then, the stopper ring 10 is inserted into the hole 1e and engages the groove 8a of the drive shaft 8, as shown in FIG. 7. Next, the aforementioned one drive shaft 8 is moved in the counter-insertion direction, and the other drive shaft 8 is inserted into the main body of the differential apparatus and is likewise engaged by the other stopper ring 10. With each drive shaft 8 moved in the counter-insertion direction, the stopper shaft 9 is inserted into the hole 1e and fixed to the main body with the bolt 9b. With this, each stopper ring 10 abuts the end surface of each ball disc 3 so that the movement of each drive shaft 8 in the counter-insertion direction is regulated. Also, since the end surface of each drive shaft 8 abuts the stopper shaft 9 so that the movement of each drive shaft 8 in the insertion direction is regulated, each drive shaft 8 is reliably connected without disassembling the main body of the differential gear.

Thus, according to the differential gear of this embodiment, the movements of each drive shaft 8 in the insertion direction and the counter-insertion direction are regulated by both the stopper rings 10 engaged to the drive shafts 8 and the stopper shaft 9 interposed between the end surfaces of the drive shafts 8. Therefore, the support structure for the drive shafts 8 on the side of the vehicle can be constructed simply and inexpensively. In this case, differential motion is achieved by both the grooves 3b provided in the ball discs 3 which rotate integrally with the drive shafts 8 and a plurality of balls 5 which roll along the grooves 3b, and the differential motion is limited by the reactive force generated between the groove 3b and the ball 5. Therefore, both a simplification in the aforementioned support structure and a considerable reduction in the cost can be achieved. Furthermore, since the drive shafts 8 can be coupled to the gear case 1 by inserting the stopper shaft 9 and the stopper rings 10 into the hole 1e provided in the gear case 1, the drive shafts 8 can be coupled to the gear case 1 without disassembling the main body of the differential gear, and this structure is extremely advantageous to vehicle fabrication.

What is claimed is:

1. A differential gear comprising:

a pair of rotating bodies arranged coaxially so that they are opposed with each other in an axial direction, the rotating bodies having holes into which left and right axles of a vehicle are inserted;

a case body which rotates on an axis coaxial with said rotating bodies;

a plurality of rolling bodies arranged with spaces in a circumferential direction between radially opposed surfaces of each rotating body and said case body;

a plurality of hold bodies arranged with said spaces in said circumferential direction between said radially opposed surfaces so that said hold bodies is freely movable in an axial direction, each hold body holding the rolling bodies, which correspond to each other in an axial direction of each rotating body, so that the rolling bodies can freely roll;

first regulating members which engage end portions of the axles inserted in the holes of the rotating bodies and abut end surfaces of the rotating bodies so that movement of the axles in the counter-insertion direction is regulated; and a second regulating member interposed between the end surfaces of the axles inserted in the holes of the rotating bodies, the second regulating member abutting the end surfaces so that movement of the axles in the insertion direction is regulated; and wherein said case body is formed with a plurality of grooves each extending in the axial direction of each rotating body, each groove being engaged by the rolling bodies so that the rolling bodies are freely movable; and wherein a surface of each rotating body, radially opposed to said case body, is formed with a groove which extends continuously in a circumferential direction of the rotating body and which is engaged by the rolling bodies, the groove of each rotating body being formed so that if a difference of rotation occurs between the rotating bodies, said hold bodies and each rolling body can reciprocate in the axial direction of each rotating body along the groove of the case body.

2. The differential gear as set forth in claim 1, wherein said case body is provided with a hole at its side surface, said first and second regulating members being inserted into said case body through said hole.

* * * * *